United States Patent

Karunaratne et al.

[11] Patent Number: 5,804,126
[45] Date of Patent: Sep. 8, 1998

[54] PROCESS FOR MAKING PREFORMS USEFUL FOR ENCAPSULATING SEMICONDUCTORS

[75] Inventors: Palitha Mahendra S. Karunaratne; Visveswaran Srinivasan; Manuel Alameda Chua, Jr.; Neep Hing Chin, all of Singapore, Singapore; Nicholas Andrew Rounds, New Britain, Pa.

[73] Assignee: Amoco Corporation, Chicago, Ill.

[21] Appl. No.: 868,679

[22] Filed: Jun. 4, 1997

Related U.S. Application Data

[63] Continuation of Ser. No. 363,117, Dec. 23, 1994, abandoned.

[51] Int. Cl.$^6$ ............................ B29C 31/04; B29C 45/02; B29C 45/73
[52] U.S. Cl. ................................. 264/328.5; 264/328.16; 264/328.17; 264/272.11
[58] Field of Search .................. 264/272.11, 272.17, 264/328.4, 328.5, 328.2, 328.16, 328.17; 425/543, 544, DIG. 228

[56] References Cited

U.S. PATENT DOCUMENTS

| | | | |
|---|---|---|---|
| 2,272,449 | 2/1942 | Wacker | 206/56 |
| 2,338,607 | 8/1944 | Wacker | 264/328.5 |
| 4,468,508 | 8/1984 | Ito et al. | 525/507 |
| 4,554,126 | 11/1985 | Sera | 264/272.17 |
| 4,569,814 | 2/1986 | Chong et al. | 264/272.17 |
| 4,645,445 | 2/1987 | Takanashi | 425/208 |
| 4,714,423 | 12/1987 | Hattori et al. | 425/376 |
| 4,740,150 | 4/1988 | Sayer | 264/45.5 |
| 4,758,398 | 7/1988 | Sparapany et al. | 264/151 |
| 4,793,785 | 12/1988 | Osada | 425/116 |
| 4,931,515 | 6/1990 | Takagishi et al. | 525/504 |
| 5,013,228 | 5/1991 | Thornthwaite et al. | 425/2 |
| 5,043,199 | 8/1991 | Kubota et al. | 264/328.5 |
| 5,098,626 | 3/1992 | Pas | 264/328.5 |
| 5,110,279 | 5/1992 | Amemiya et al. | 425/208 |
| 5,132,069 | 7/1992 | Newton | 264/257 |
| 5,151,276 | 9/1992 | Sato et al. | 425/110 |
| 5,198,232 | 3/1993 | Thornthwaite et al. | 425/2 |
| 5,200,125 | 4/1993 | Osada | 264/272.11 |
| 5,232,654 | 8/1993 | Aida et al. | 264/572 |
| 5,266,261 | 11/1993 | Suter | 264/328 |
| 5,431,854 | 7/1995 | Pas | 264/328.5 |

FOREIGN PATENT DOCUMENTS

| | | | |
|---|---|---|---|
| 1028112 | 3/1978 | Canada | 18/186 |
| 0530377 | 3/1993 | European Pat. Off. | 21/56 |
| 5423659 | 6/1987 | Japan . | |
| 67957 | 9/1973 | Luxembourg . | |
| 1116541 | 6/1968 | United Kingdom . | |

OTHER PUBLICATIONS

Pennwalt/Stokes Technical Bulletin #11, Factors Determining the Hardness of Tablets.
Stokes–Merrill, Inc. Laboratory Information Bulletin #14, Tablet Making.
Sumitomo Chemical Co., Ltd., Sumi–Epoxy ESB–400.
Sumitomo Chemical Co., Ltd., Sumi–Epoxy ESCN, Analysis of Molding Compound Produced by Japanese Manufacturers.

*Primary Examiner*—Angela Ortiz
*Attorney, Agent, or Firm*—Mary Jo Kanady; Scott P. McDonald; Wallace L. Oliver

[57] ABSTRACT

Preform useful for encapsulating semiconductors and other electric or electronic devices are prepared by a process which comprises warming thermoset resin to form a melt, injecting it into a mold, and cooling to form a solidified molding, all without substantially curing the thermoset resin.

26 Claims, 3 Drawing Sheets

PROCESS FOR MAKING PREFORMS USEFUL FOR ENCAPSULATING SEMICONDUCTORS

This is a continuation of application Ser. No. 08/363,117 filed Dec. 23, 1994, now abandoned.

BACKGROUND OF THE INVENTION

I. Field of the Invention

This invention relates to preforms suitable for encapsulating electrical or electronic devices.

II. Description of the Prior Art

Thermosetting molding preforms are conventionally used to encapsulate electrical or electronic devices in a process wherein the device is arranged in a mold and the preform is heated to plasticize it and encapsulate the device, and then allowed to cure.

The conventional method of making such preforms is to use tableting equipment in which solid resin, which is usually premixed with filler and other additives, is tableted under high pressure. The conventional method suffers problems due to wearing of the tableting presses, as well as producing preform tablets having voids and other quality problems. U.S. Pat. No. 4,554,126 to Sera disclosed tableting under higher than usual pressures of 4 ton/cm$^2$ or more in order to reduce the number of voids in the resultant preform tablets. Preform tablet density of 95% or more is alleged by Sera by use of his method; such density would be highly desirable if it were consistently achievable by Sera's method.

It has been a longfelt need in this art to find a more efficient method of producing preforms and to produce preforms having very high quality.

SUMMARY OF THE INVENTION

The present invention provides such an efficient method, higher quality preforms, and improved encapsulated electrical or electronic devices.

The present invention comprises a method of preparing preforms suitable for encapsulating electrical or electronic devices comprising:

A. warming thermoset resin to form a warm melt without substantially curing said thermoset resin;

B. injecting said warm melt into a mold without substantially curing said thermoset resin;

C. cooling said warm melt in said mold to form a solidified molding in the form of a preform, and removing said preform from said mold without substantially curing said thermoset resin.

The invention also comprises the resultant preforms which have improved quality as evidenced by substantially no voids, a density of at least 95%, uniform color, dust free, and substantially free of contamination.

The invention also includes a method of encapsulating devices using the aforementioned preforms, and the resultant encapsulated devices.

Another aspect of the invention is a novel mold design which comprises an ejector pin which is of the same cross-section as the mold cavity, and providing means to adjust or index the travel of the ejector pin and thus adjust the depth of the mold cavity.

DETAILED DESCRIPTION OF THE INVENTION AND THE PREFERRED EMBODIMENTS

A wide range of thermoset resins are suitable, and their choice depends on the application specifications which are desired. For example, the thermoset resin can be epoxy resin; polyester resin; silicone resin; thermosetting rubber; and/or cyanate resin. Preferred resins are those prepared from cresol novolac epoxy/phenol novolac hardener systems.

The thermoset resin can be mixed with other materials such as fillers, curing accelerators, release agents, flame retardants, and surface-processing agents, preferably prior to step A. These other materials are conventional in the art, and usually include at least filler, which is usually silica, and usually constitute at least 50, and up to 85% by weight. The mixture is usually referred to as the "preblend."

The devices to be encapsulated are usually semiconductors, although other electric or electronic devices, for example LED's, can also be encapsulated. Use of the improved preform results in improved quality encapsulated devices, even when conventional encapsulation methods are used. The encapsulation method typically includes providing a mold having an upper mold die and a lower mold die, providing an electrical or electronic device to be encapsulated, plasticizing the preform, fixing the device between said upper mold die and said lower mold die, and injecting the resultant plasticized preform into the mold.

The novel method of preparing the preforms can be conducted in a variety of equipment capable of warming the thermoset resin without substantially curing it to form a warm melt, then injecting the warm melt into a mold, and then cooling the melt to form a solidified molding in the form of a preform without substantially curing the thermoset resin. In the preferred method an injection molding apparatus having a hopper 23, barrel 22, nozzle area 21, and sprue runner, as well as a mold having a fixed plate and movable plate cavity area, preferably with cooling means which can be a liquid cooling fluid such as chilled water, antifreeze, or compressed gas, is used. The apparatus is arranged so that the warm melt is injected from the nozzle into the mold cavity in which the preform is cooled. It is important to control the temperature, pressure, and the like so that the thermoset resin does not substantially cure in the warm melt or in the resultant preform because the resin must not be cured until the preform is used to encapsulate the devices; otherwise the preform will not be useful for its intended purpose.

The thermoset resin is usually mixed with fillers, curing accelerators, release agents, fire retardants, and/or processing agents either prior to or during the warming step. The preferred warming temperature in step A is about 50 to 90

Figure 5:
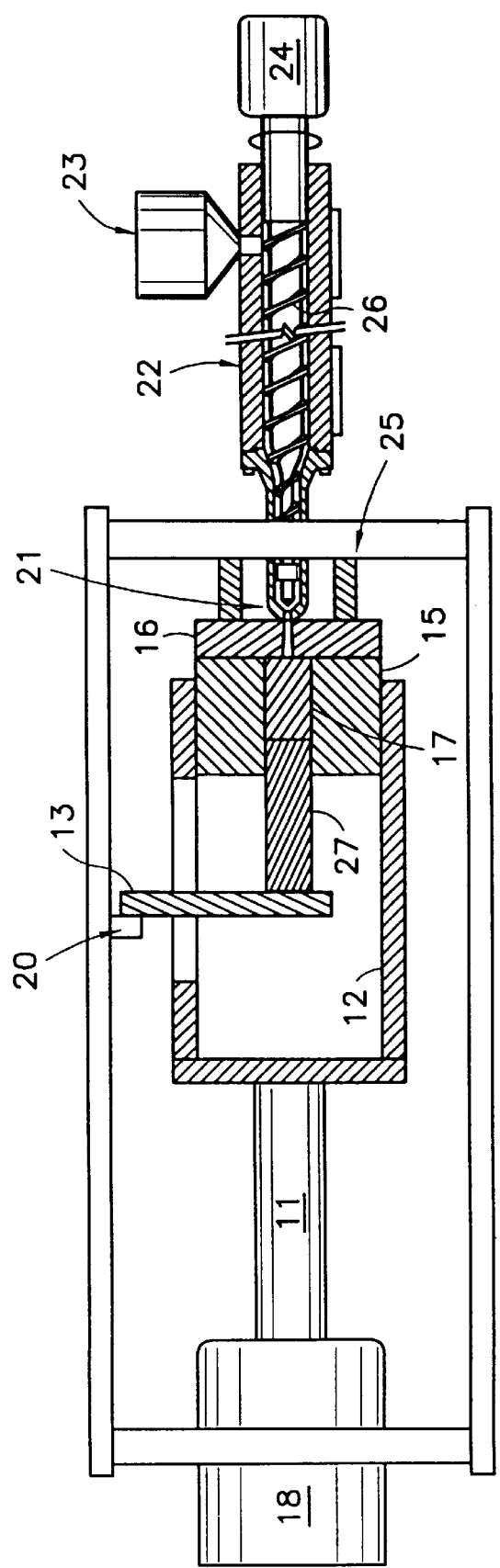
FIG. 5 is a side elevational cross-section of an injection molding unit useful according to the invention, showing an improved mold ejector pin according to the invention.

C., depending on the particular thermoset resin and the other conditions. The exact temperature must be optimized in relation to all of the other conditions in order to obtain a warm, flowable melt without substantially curing the resin. The thermoset resin is preferably premixed with the fillers, etc., and then introduced at ambient temperature in the hopper 23 and then transported by means of the screw 26 along the barrel 22 which is preferably maintained at about 65° C. to the injection nozzle 21 which is preferably heated to about 5°–10° C. higher than the barrel temperature. The shot size capacity is preferably 10 to 1000 grams, and more preferably about 40 to 600 grams. The warm melt is injected from the nozzle 21 through a sprue in the fixed plate 16 into the movable plate cavity 15, where it is maintained for a short period, usually a few seconds to a minute, preferably about 15 to 25 seconds. The preform 17 is cooled and becomes dimensionally stable, and is then ejected (FIG. 5) from the mold cavity 15 either by a conventional pin 14 or a novel pin configuration 27.

Figure 1:
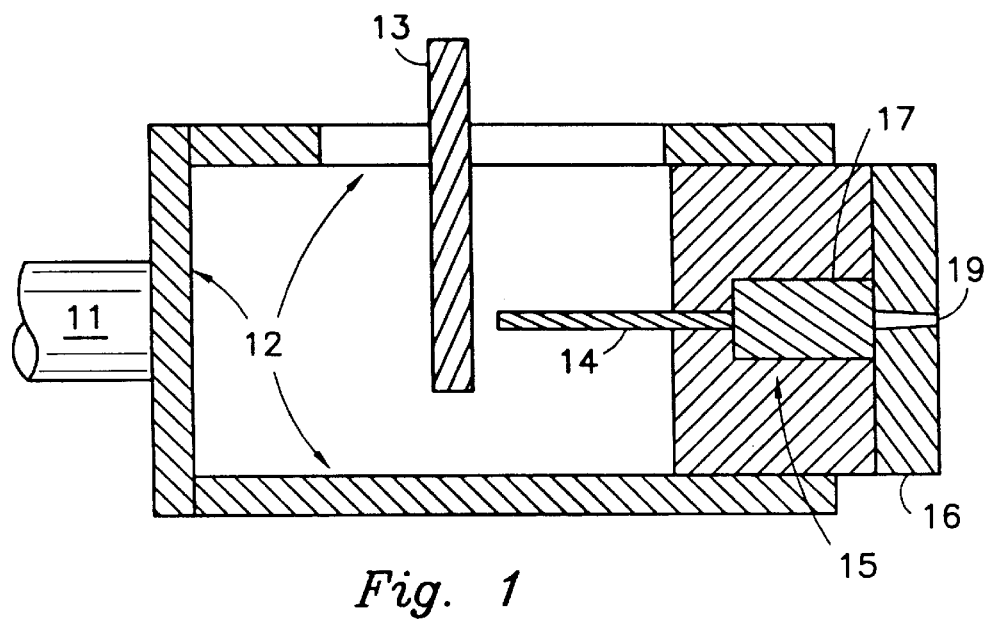
FIG. 1 is a side elevational view in section of a conventional mold in closed position, showing a molded preform in the mold cavity.
Figure 2:
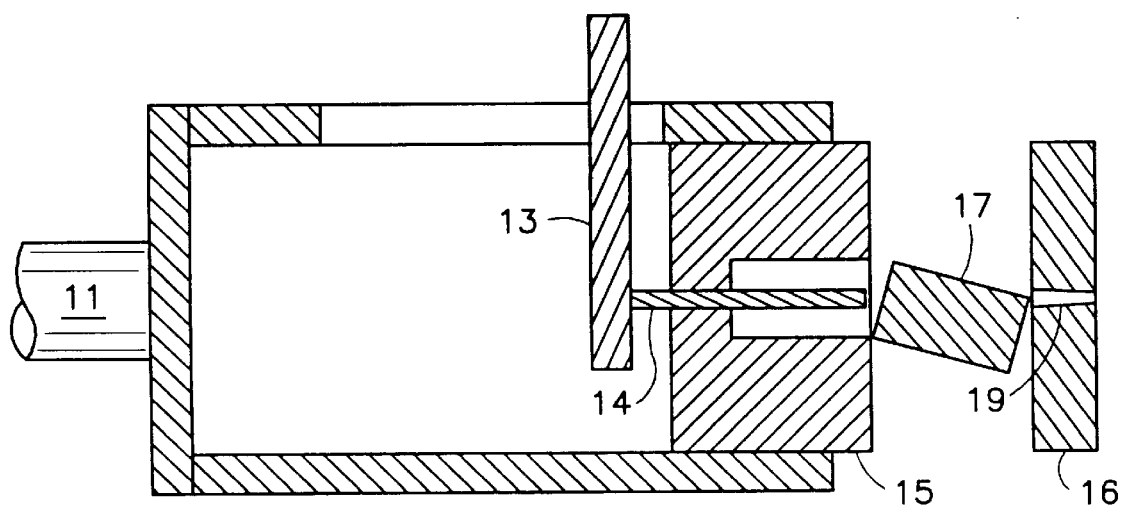
FIG. 2 is a side elevational view in section of a conventional mold in open position, showing a molded preform being ejected.
Figure 3:
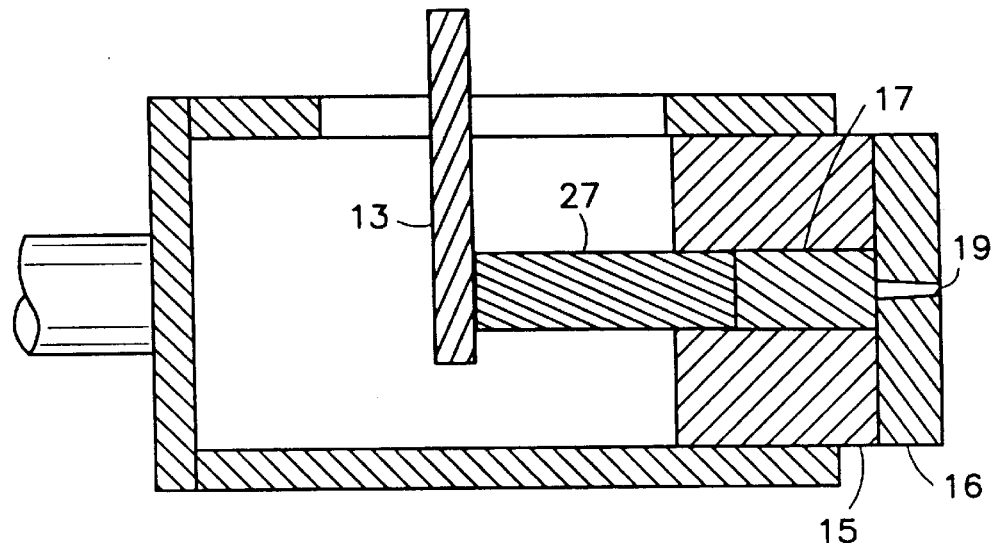
FIG. 3 is a side elevational view in section of the novel mold of the invention in closed position showing a molded preform in the mold cavity.
Figure 4:
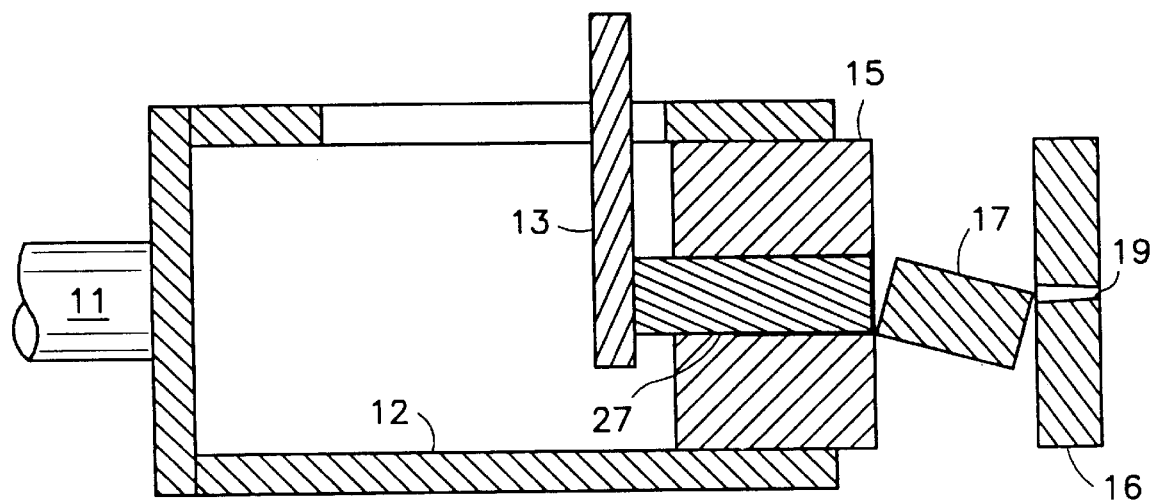
FIG. 4 is a side elevational view in section of the novel mold of the invention in open position showing a molded preform being ejected from the mold cavity by means of a novel ejector cylinder according to the invention.

Conventional movable plate cavities which include an ejector pin 14 (FIGS. 1 and 2) can be used, but it is preferred to use a novel apparatus to eject the preforms. The novel ejection means is a piston 27 which has the same cross-section as the cylindrical mold 15. The piston 27 can be indexed with adjustable ejector activation device 13 so as to change the size of the cylindrical mold and thus produce cylindrical preforms 17 of varying lengths, as desired. The cross-section of the mold and piston can be other than circular, e.g., square, if desired. Preferably, the piston 14 remains fixed and the movable plate 15 is withdrawn or opened away from the fixed plate 16 to eject the preforms 17.

One injection molding press can serve multiple mold cavities in order to increase production rates in view of the relatively long cooling times required compared to the short injection times.

The resultant preform has higher than usual density, consistently above 95% of theoretical density, which is a measure of void imperfections. Using the prior art tableting process, maximum L/D (length over diameter) ratio was 2, whereas the process of this invention permits L/D ratios up to 5. The novel preforms also have the advantages of much greater resistance to breaking and chipping, are of uniform color, are dust free, have more consistent spiral flow values in that variations of less than 0.75 inches are achieved versus up to 2 inches using the prior method. Flash and bleed values for low viscosity products of 2–8 mm versus 6–20 mm for prior art, and much better weight control due to minimal weight variations, are achieved.

In addition, the invention involves fewer processing steps and lower contamination risks, resulting in lower moisture levels.

When used in a process to encapsulate electrical or electronic devices, the resultant encapsulated devices are of higher than conventional quality because of the improved quality preforms made according to this invention.

EXAMPLES

GENERAL METHOD

An injection molding machine equipped with a powder feeding unit and a wear resistant plasticizing unit having a shot size capacity between 40 and 600 grams of epoxy, accompanied by a clamping unit having a clamping tonnage between 50 and 400 tons which houses the mold that produces the desired preforms, was used. Preforms produced varied from 11 mm to 35 mm in diameter and 25 mm to 40 mm in height.

A screw and a heated barrel assembly function to heat soften (plasticize) the plastic material without substantially curing the thermoset resin. The thermoset resin formulation is drawn into the barrel by the action of the rotating screw, and softens due to frictional forces and the conductive heat input. The screw moves back as a result of the pressure generated by the conveyed material in the head of the screw and the amount of screw movement controls the quantity of softened resin that is injected (shot size). The temperature used in the plasticizing unit is between 50° and 90° C.

When the cycle commences, the mold closes and the heat softened material (plasticized material) is injected into the cavity of the mold through a feed system (sprue and runners only, no gates). It is injected by the action of the screw moving forward, i.e., the screw acts as a ram. The pressure exerted on the melt is between 300 and 700 bar. This softened material after injection is maintained under pressure higher than the melt pressure, to prevent plastic from flashing and also to cool and render shape to the plastic in the mold which, contrary to conventional thermoset molding, is kept cold, at between 10° and 25° C.

Preform moldings become hard after cooling, after which the mold is opened and the finished preforms are ejected out from the mold using the novel movable bottom rather than an ejector pin.

Example 1

| Product Produced | Preform diameter = 11 mm |
| --- | --- |
|  | Preform height = 25 mm |
|  | Preform weight = 5.2 + 0.2 gm |
|  | # of Preforms = 8 |
| Formulation Used = A |  |

| Formulation Details: A | |
| --- | --- |
| Component | % Used |
| Epoxy Cresol Novolac Resin | 10.96 |
| Fillers (Silica) | 76.00 |
| Hardener | 5.43 |
| Catalyst | 0.19 |
| Flame Retardant (Brominated Resin, Antimony Oxide) | 2.80 |
| Lubricant | 0.12 |
| Modifiers | 3.70 |
| Coupling Agent | 0.60 |
| Pigment | 0.20 |

| Conditions on Injection Molding Machine and Mold | |
| --- | --- |
| Temperature (barrel) | 65° C. |
| Temperature (near nozzle) | 75° C. |
| Mold Temperature | 30° C. (room temp.) |
| Screw RPM | 50 rpm |
| Melt Injection Pressure | approx. 500 bar |
| Mold Clamping Pressure | 50 tons |
| Cooling Time | 25 seconds |
| Cooling temperature | 10–25° C. |

Example 2

| Product Produced | Preform diameter = 14 mm |
| --- | --- |
|  | Preform height = 25 mm |
|  | Preform weight = 7.6 + 0.2 gm |
| Formulation Used = A |  |

| Formulation Details: A | |
| --- | --- |
| Component | % Used |
| Epoxy Cresol Novolac Resin | 10.96 |

-continued

| | |
|---|---|
| Fillers (Silica) | 76.00 |
| Hardener | 5.43 |
| Catalyst | 0.19 |
| Flame Retardant (Brominated Resin, Antimony Oxide) | 2.80 |
| Lubricant | 0.12 |
| Modifiers | 3.70 |
| Coupling Agent | 0.60 |
| Pigment | 0.20 |

Conditions on Injection Molding Machine and Mold

| | |
|---|---|
| Temperature (barrel) | 65° C. |
| Temperature (near nozzle) | 75° C. |
| Mold Temperature | 30° C. (room temp.) |
| Screw RPM | 50 rpm |
| Melt Injection Pressure | approx. 500 bar |
| Mold Clamping Pressure | 50 tons |
| Cooling Time | 35 seconds |
| Cooling temperature | 10–25° C. |

Example 3

| Product Produced | Preform diameter = 20 mm |
| | Preform height = 25 mm |
| | Preform weight = 15.2 + 0.2 gm |
| Formulation Used = A | |

Formulation Details: A

| Component | % Used |
|---|---|
| Epoxy Cresol Novolac Resin | 10.96 |
| Fillers (Silica) | 76.00 |
| Hardener | 5.43 |
| Catalyst | 0.19 |
| Flame Retardant (Brominated Resin, Antimony Oxide) | 2.80 |
| Lubricant | 0.12 |
| Modifiers | 3.70 |
| Coupling Agent | 0.60 |
| Pigment | 0.20 |

Conditions on Injection Molding Machine and Mold

| | |
|---|---|
| Temperature (barrel) | 65° C. |
| Temperature (near nozzle) | 75° C. |
| Mold Temperature | 30° C. (room temp.) |
| Screw RPM | 50 rpm |
| Melt Injection Pressure | approx. 500 bar |
| Mold Clamping Pressure | 50 tons |
| Cooling Time | 45 seconds |
| Cooling temperature | 10–25° C. |

Example 4

| Product Produced | Preform diameter = 35 mm |
| | Preform height = 40 mm |
| | Preform weight = 48 + 1.0 gm |
| Formulation Used = B | |

Formulation Details: B

| Component | % Used |
|---|---|
| Epoxy Cresol Novolac Resin | 12.540 |
| Fillers (Silica) | 72.512 |
| Hardener | 5.649 |
| Catalyst | 0.230 |
| Flame Retardant (Brominated Resin, Antimony Oxide) | 3.607 |
| Lubricant | 0.530 |
| Modifiers | 4.282 |
| Coupling Agent | 0.400 |
| Pigment | 0.250 |

Conditions on Injection Molding Machine and Mold

| | |
|---|---|
| Temperature (barrel) | 65° C. |
| Temperature (near nozzle) | 75° C. |
| Mold Temperature | 30° C. (room temp.) |
| Screw RPM | 50 rpm |
| Melt Injection Pressure | approx. 600 bar |
| Mold Clamping Pressure | 60 tons |
| Cooling Time | 60 seconds |
| Cooling temperature | 10–25° C. |

TABLE 1

Properties of Preforms

| Formulation used | Expt. No. | GSF in. | GT sec. | Visc. poise | F/B 76U mm | 51U mm | 25U mm | 13U mm | 6U mm |
|---|---|---|---|---|---|---|---|---|---|
| A | 1 | 30.0 | 21 | 85 | 13.06 | 1.8 | 1.0 | 2.04 | 2.02 |
| | | 39.5 | 21 | | | | | | |
| | | 39.0 | 21 | | | | | | |
| A | 2 | 36.0 | 20 | 97 | 13.06 | 2.39 | 2.47 | 2.7 | 2.87 |
| | | 35.25 | 20 | | | | | | |
| | | 36.0 | 19 | | | | | | |
| A | 3 | 33.25 | 22 | 99 | 15.04 | 2.12 | 1.34 | 1.95 | 2.21 |
| | | 32.75 | 23 | | | | | | |
| | | 33.0 | 22 | | | | | | |
| B | 4 | 40.0 | 20 | 176 | 5.25 | 4.64 | 1.08 | 1.05 | 1.77 |
| | | 40.0 | 21 | | | | | | |
| | | 39.75 | 19 | | | | | | |

GSF: Granular Spiral Flow
GT: Gel Time
Visc.: Viscosity
F/B: Flash and Bleed

The variation between GSF values is not more than 0.75 inches. This is a great improvement from preforms made by the conventional tableting process in which GSF variations can be as high as 3 inches, showing surprisingly better consistency in product properties of preform tablets made by the process of the invention.

The flash and bleed data as shown in columns 6 through 10 are significantly better than the ones being obtained using conventional tableting processes in which the minimum value obtainable for these same formulations in the 6U range is not less than 6 mm.

What is claimed is:

1. A method of preparing preforms suitable for encapsulating electrical or electronic devices comprising:

A. introducing a thermoset resin formulation into an injection molding device via a powder feeding unit connected thereto and then warming said thermoset resin formulation to form a warm melt without substantially curing said resin;

B. injecting said warm melt into a mold without substantially curing said thermoset resin;

C. cooling said warm melt in said mold to form a solidified molding in the form of a preform, and removing said preform from said mold without substantially curing said thermoset resin, said preform having a density that is at least 95% of a theoretical maximum preform density.

2. Method according to claim 1 wherein said thermoset resin is: epoxy resin; polyester resin; silicone resin; thermosetting rubber; or cyanate resin.

3. Method according to claim 2 wherein said thermoset resin is an cresol novolac epoxy/phenol novolac hardener system.

4. Method according to claim 1 wherein in step A said warming is to a temperature of about 50° to 90° C.

5. Method according to claim 1 wherein said warming step is conducted in an injection molding device having a nozzle, and said warm melt is injected from said nozzle into a cavity in said mold.

6. Method according to claim 1 wherein said thermoset resin is mixed with one or more of: fillers, curing accelerators, release agents, fire retardants, and processing agents, either prior to or during step A.

7. An injection molding process for preparing preforms suitable for encapsulating electrical or electronic devices comprising:
   A. introducing a thermoset resin formulation into an injection molding device via a powder feeding unit connected thereto and then warming said thermoset resin formulation to form a warm melt having a temperature of at least 50° C. without substantially curing said resin by heating the resin in an injection molding device having a heatable nozzle;
   B. heating the nozzle to a temperature at least 5° C. higher than the warm melt and injecting said warm melt from said nozzle into a cavity in a mold at a pressure of from about 300 to about 700 bar without substantially curing said thermoset resin;
   C. cooling said warm melt in said mold to form a solidified molding in the form of a preform, and removing said preform from said mold without substantially curing said thermoset resin, said preform having a density that is at least 95% of a theoretical maximum preform density.

8. An injection molding process for preparing preforms suitable for encapsulating electrical or electronic devices comprising:
   A. introducing a thermoset resin preblend formulation into an injection molding device via a powder feeding unit connected thereto and then warming said thermoset resin formulation to form a warm melt without substantially curing said resin by heating the resin in an injection molding device at a temperature of from about 50° C. to about 90° C. wherein said injection molding device has a barrel and a nozzle connected thereto and wherein the temperature of said nozzle is from about 5° C. to about 10° C. higher than the temperature of said barrel;
   B. injecting said warm melt from said nozzle into a cavity in a mold without substantially curing said thermoset resin;
   C. cooling said warm melt in said mold to form a solidified molding in the form of a preform, and removing said preform from said mold without substantially curing said thermoset resin, said preform having a density that is at least 95% of a theoretical maximum preform density and yielding a flash and bleed value of less than 6 millimeters at 6 microns.

9. A process according to claim 8 comprising:
   A. introducing a thermoset resin formulation into an injection molding device via a powder feeding unit connected thereto and then warming said thermoset resin formulation to form a warm melt without substantially curing said resin by heating the resin in an injection molding device at a temperature of from about 50° C. to about 90° C. wherein said injection molding device has a barrel and a nozzle connected thereto and wherein the temperature of said nozzle is from about 5° C. to about 10° C. higher than the temperature of said barrel;
   B. injecting said warm melt from said nozzle into a cavity in a mold at a pressure of from about 300 to about 700 bar without substantially curing said thermoset resin;
   C. cooling said warm melt in said mold to form a solidified molding in the form of a preform, and removing said preform from said mold without substantially curing said thermoset resin.

10. A process according to claim 7 wherein said mold is at a temperature of from about 10° C. to about 25° C.

11. A process according to claim 7 wherein the temperature of said barrel is about 65° C. and the temperature of said nozzle is from about 70° to about 75° C.

12. A process according to claim 9 wherein said warm melt is injected from said nozzle into a cavity in a mold at a pressure of about 500 bar.

13. An injection molding process for preparing preforms suitable for encapsulating electrical or electronic devices comprising:
   A. introducing a thermoset resin formulation into an injection molding device via a powder feeding unit connected thereto and then warming said thermoset resin formulation to form a warm melt without substantially curing said resin by heating the resin in an injection molding device at a temperature of from about 50° C. to about 90° C. wherein said injection molding device has a barrel and a nozzle connected thereto and wherein the temperature of said nozzle is from about 5° C. to about 10° C. higher than the temperature of said barrel;
   B. injecting said warm melt from said nozzle into a cavity in a mold, wherein said mold is at a temperature of from about 10° C. to about 25° C., at a pressure of from about 300 to about 700 bar without substantially curing said thermoset resin;
   C. cooling said warm melt in said mold to form a solidified molding in the form of a preform, and removing said preform from said mold without substantially curing said thermoset resin, said preform having a density that is at least 95% of a theoretical maximum preform density and yielding a flash and bleed value of less than 6 millimeters at 6 microns.

14. A process according to claim 13 wherein the temperature of said barrel is about 65° C. and the temperature of said nozzle is from about 70° to about 75° C.

15. A process according to claim 13 wherein said warm melt is injected from said nozzle into a cavity in a mold at a pressure of about 500 bar.

16. A process according to claim 13 wherein said thermoset resin is selected from the group consisting of epoxy resin, polyester resin, silicone resin, thermosetting rubber, and cyanate resin.

17. A process according to claim 13 wherein said thermoset resin is a cresol novolac epoxy/phenol novolac hardener system.

18. A process according to claim 7 wherein said warm melt is injected into multiple cavities in a mold without substantially curing said themoset resin.

19. A method according to claim 1 wherein said preform has an L/D ratio greater than 2.

20. A method according to claim 7 wherein said preform has an L/D ratio greater than 2.

21. A method for producing a plurality of preforms for use in encapsulating semiconductor devices, the method comprising the steps of:

introducing a thermoset resin preblend formulation into an injection molding device;

warming the preblend formulation to plasticize the resin preblend formulation in the injection molding device without substantially curing the formulation;

injecting the plasticized formulation into a mold cavity;

cooling the plasticized formulation to produce a substantially uncured preform having a density of at least 95% of a maximum preform theoretical density;

repeating the warming, injecting and cooling steps to form a plurality of preforms exhibiting a variation in granular spiral flow value of not more than 0.75 inches.

22. The process of claim 21 wherein the plurality of preforms exhibit a flash and bleed value of less than 6 millimeters at 6 microns.

23. The process of claim 21 wherein the preblend formulation is warmed to a temperature of between about 50° C. and 90° C.

24. The process of claim 23 wherein the preblend formulation is heated to between about 50° C. and 90° C. in the injection molding device.

25. The process of claim 23 wherein the plasticized preblend is injected into the mold at a pressure of between about 300 and 700 bar.

26. The process of claim 24 wherein the plasticized preblend is injected into the mold at a pressure of between about 300 and 700 bar.

* * * * *